United States Patent
Park (10) Patent No.: US 7,251,729 B1
(45) Date of Patent: Jul. 31, 2007

(54) AUTHENTICATION METHOD FOR ESTABLISHING CONNECTION BETWEEN DEVICES

(75) Inventor: Jae-han Park, Yongin (KR)

(73) Assignee: Samsung Electronics Co., Ltd., Kyunggi-Do (KR)

( * ) Notice: Subject to any disclaimer, the term of this patent is extended or adjusted under 35 U.S.C. 154(b) by 831 days.

(21) Appl. No.: 09/721,713

(22) Filed: Nov. 27, 2000

(30) Foreign Application Priority Data

Nov. 25, 1999 (KR) ............................... 1999-52658

(51) Int. Cl.
*H04L 9/00* (2006.01)
*G06F 7/04* (2006.01)
*G06F 17/30* (2006.01)
*G06F 12/14* (2006.01)
*G06F 15/173* (2006.01)
*G06K 9/00* (2006.01)
*G06K 1/00* (2006.01)

(52) U.S. Cl. .................. 713/168; 713/169; 713/170; 713/171; 713/172; 726/2; 726/3; 726/4; 726/5; 726/27; 726/28; 726/29; 726/30; 380/270; 380/260; 380/261; 380/262; 709/223; 709/224; 709/225; 709/226

(58) Field of Classification Search ................ 380/270; 713/168–172, 161, 151; 726/2–7, 27–30
See application file for complete search history.

(56) References Cited

U.S. PATENT DOCUMENTS 5,799,085 A * 8/1998 Shona ..................... 713/169

FOREIGN PATENT DOCUMENTS

| JP | 63-273980 A | 11/1988 |
|---|---|---|
| JP | 5-75598 A | 3/1993 |

OTHER PUBLICATIONS

Specification of the Bluetooth System Version 1.0 A (Jul. 26th, 1999).*
Jaap Haartsen, "Bluetooth-The universal radio interface for ad hoc, wireless connectivity", Ericsson REVIEW, Oct. 26, 1998, vol. 75, No. 3, pp. 110-117.

* cited by examiner

*Primary Examiner*—Ayaz Sheikh
*Assistant Examiner*—Longbit Chai
(74) *Attorney, Agent, or Firm*—Sughrue Mion, PLLC (57) ABSTRACT

An authentication method for establishing a connection between devices that want to communicate data in a communication environment using communication specification such as Bluetooth is provided. In the authentication method, it is determined whether the authentication procedure for establishing a connection between devices that want to communicate data is performed as a unilateral authentication procedure or as a mutual authentication procedure, according to the condition of one of the two devices that can communicate data and receives an authentication request, and performing the authentication procedure. Therefore, the authentication method more reliably and precisely establishes a connection between devices that want to communicate data in a communication environment operating based on communication specifications such as Bluetooth.

5 Claims, 7 Drawing Sheets

AUTHENTICATION METHOD FOR ESTABLISHING CONNECTION BETWEEN DEVICES

BACKGROUND OF THE INVENTION

1. Field of the Invention

The present invention relates to an authentication method for establishing a connection between devices that can communicate data, and more particularly, to an authentication method for establishing a connection between devices that want to communicate data in a telecommunications environment using communication specifications such as Bluetooth. The present application is based on Korean Patent Application No. 52658/1999, which is incorporated herein by reference.

2. Description of the Related Art

Bluetooth is a local wireless data communication specification which enables high speed data communications between various electronic devices, using radio frequency (RF) without physical cables. Since Bluetooth adopts Continuous Variable Slope Delta Modulation (CVSD), Bluetooth can send voice as well as character data without limits in space.

For data communications between devices operating in a telecommunications environment using such communication specifications as Bluetooth, a connection must be established between devices before communicating data. The process for establishing a connection can be broadly divided into synchronizing radio frequency, establishing a link, and establishing a channel. However, since the specification for such communication specifications as Bluetooth has not been perfectly stipulated yet, research for preparing specifications corresponding to diverse parts, including the connection procedure, are proceeding from various angles.

SUMMARY OF THE INVENTION

To solve the above problems, it is an objective of the present invention to provide an authentication method for establishing a connection between devices that want to communicate data in a telecommunications environment using communication specifications such as Bluetooth.

To solve the above problems, it is another objective of the present invention to provide an authentication method for performing an authentication procedure to establish a connection between devices that want to communicate data, according to the authentication conditions of the other device with which the present device wants to communicate, in a telecommunications environment using communication specifications such as Bluetooth.

To solve the above problems, it is an objective of the present invention to provide an authentication method for establishing a connection between devices that can wirelessly communicate data, the method having the steps of (a) sending a first authentication-request message to the other device in order to perform an authentication procedure with the other device to which a connection is wanted; (b) sending a predetermined message according to the current operation mode to the other device and storing the predetermined message when the authentication-response message to the first authentication-request message is received; (c) after performing the step (b), checking whether or not the received first message is a response message corresponding to the predetermined message when a first message from the other device is received; (d) sending a response message corresponding to a second authentication-request message to the other device when the result of checking in the step (c) indicates that the first message is not the response message, but the second authentication-request message; (e) after performing the step (d), checking whether or not a second message is a response message corresponding to the predetermined message when the second message from the other device is received; and (f) finishing the authentication procedure when the result of checking in the step (e) indicates that the second message is a response message corresponding to the predetermined message.

To solve another problem, it is an objective of the present invention to provide an authentication method for establishing a connection between devices that can wirelessly communicate data, the method having the steps of: (a) sending a response message corresponding to a first authentication-request message when the first authentication-request message from another device that wants to establish a connection is received; (b) after performing the step (a), checking the authentication condition of the present device when a predetermined message from the other device is received; (c) storing the predetermined message and sending a second authentication-request message to the other device when the result of checking indicates that a mutual authentication is required; and (d) after performing the step (c), sending a response message corresponding to the message stored in the step (c), to the other device when a response message from the other device corresponding to the second authentication-request message is received, and finishing the authentication procedure.

BRIEF DESCRIPTION OF THE DRAWINGS

The above objectives and advantages of the present invention will become more apparent by describing in detail a preferred embodiment with reference to the attached drawings in which.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1:
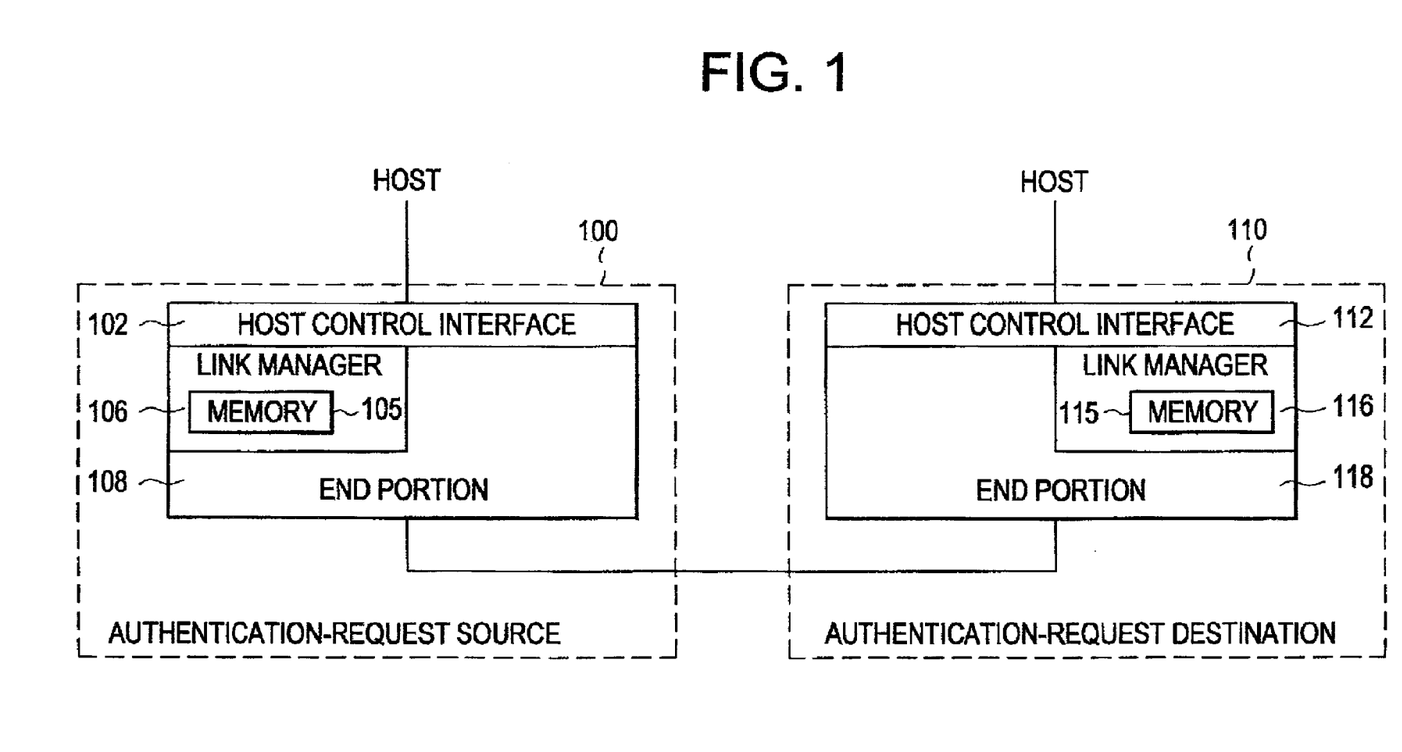
FIG. 1 is a functional block diagram of devices for performing a method according to the present invention.

FIG. 1 is a functional block diagram of systems for performing a method according to the present invention. Referring to FIG. 1, the system includes an authentication-request source 100 and an authentication-request destination 110. The authentication-request source 100 and the authentication-request destination 110 are installed in their respective devices that can communicate data using communication specifications such as Bluetooth. For example, the authentication-request source 100 is installed in a source device, while the authentication-request destination is installed in a destination device. The authentication-request source 100 and the authentication-request destination 110 both have a host controller interface 102 and 112, a link manager 106 and 116, and an end portion 108 and 118, respectively. Each of the link managers 106 and 116 includes a memory 105 and 115.

The host controller interfaces 102 and 112 communicate data and interface, corresponding to layer 2, with their respective hosts (not in drawings). The authentication-request source 100 and the authentication-request destination 110 of FIG. 1 are separated from each host (not in drawings). In a broad sense, the host (not in drawings) is a device operating according to communication specifications such as Bluetooth, while in a narrow sense, the host is a module installed in a system having multiple functions, and controlled by the central processing unit (not in drawings) of the system so that the module operates in a mode complying with communication specifications such as Bluetooth. This host (not in drawings) is implemented to perform Logical Link Control and Adaptation Protocol (L2 CAP), which performs a function corresponding to layer 2 in order to establish a channel to each of the host controller interfaces 102 and 112, and the application functions.

The link managers 106 and 116 are implemented to establish and release a connection to a device that wants to communicate data according to communication specifications such as Bluetooth, and to perform a function for handling a link established between link managers 106 and 116 of corresponding devices when a connection is established. Particularly, the memories 105 and 115 store Link Management Protocol (LMP) messages, which are required for establishing a connection between corresponding devices.

The end portions 108 and 118 perform high frequency processing and baseband control. The high frequency processing is for enabling high frequency communications between devices that want to communicate data in a communication environment complying with Bluetooth, and includes synchronization of high frequency signals and conversion of bits into symbols. The baseband control function includes coding/ciphering, packet handling, and frequency hopping.

Thus, the formed authentication-request source 100 and authentication-request destination 110 synchronize high frequency signals between themselves according to the requests of their respective hosts and then establish a connection between themselves. Establishing a connection between themselves is performed through an authentication procedure between the link managers 106 and 116, which are installed in the authentication-request source 100 and the authentication-request destination 110, respectively.

Figure 2:
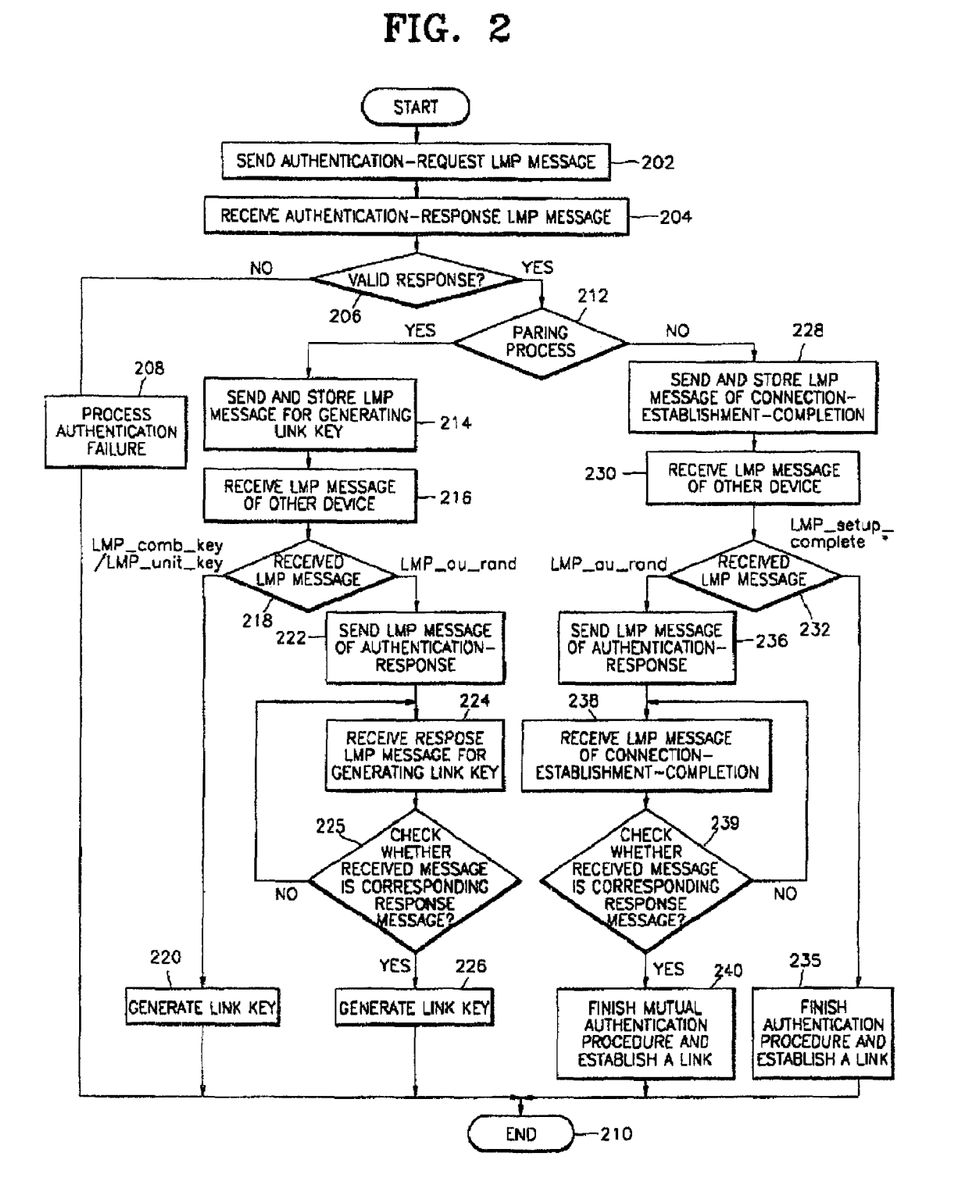
FIG. 2 is a flowchart showing the operation in an authentication-request source in performing an authentication method according to the present invention.
Figure 3:
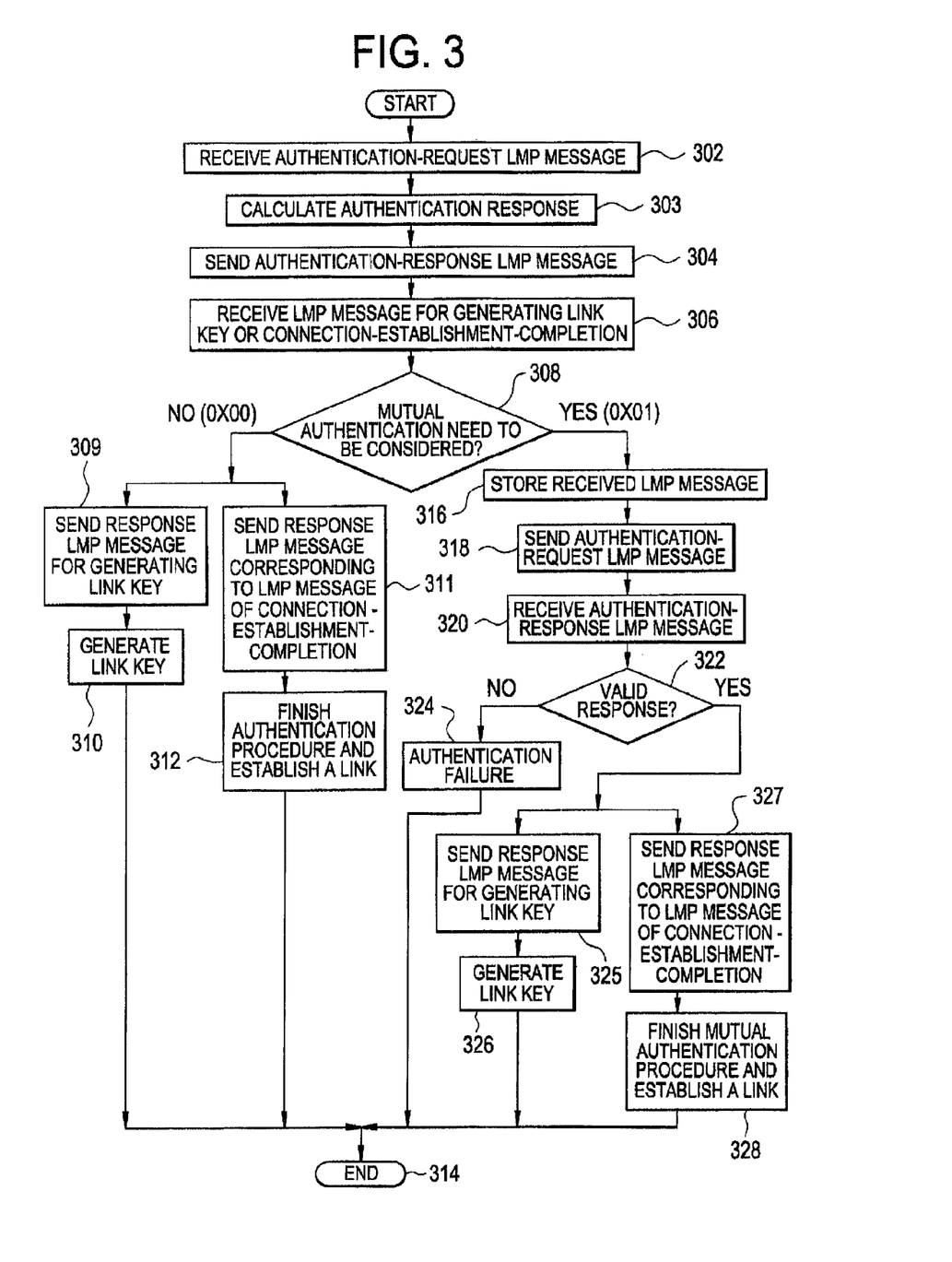
FIG. 3 is a flowcharts showing the operation in an authentication-request destination in performing an authentication method according to the present invention.

FIG. 2 is a flowchart showing the operation in the authentication-request source in performing an authentication method according to the present invention, and FIG. 3 is a flowchart showing the operation in the authentication-request destination in performing an authentication method according to the present invention.

Referring to FIGS. 1 through 3, the authentication method according to the present invention will now be explained.

First, the link manager 106 of the authentication-request source 100 sends an authentication-request LMP message (LMP_au_rand) through the end portion 108 in step 202, and then the link manager 116 of the authentication-request destination 110 receives the authentication-request LMP message (LMP_au_rand) through the end portion 118 in step 302.

In step 303, the link manager 116 calculates an authentication-response to the received authentication-request LMP message (LMP_au_rand). That is, the authentication-response is calculated using random information, which is included in the received authentication-request LMP message (LMP_au_rand), and key information, which the link manager 116 holds. In step 304, the link manager 116 sends an authentication-response LMP message (LMP_sres), which is formed from the calculated authentication-response, to the authentication-request source 100 through the end portion 118.

Then, the link manager of the authentication-request source 100 receives the authentication-response LMP message (LMP_sres) through the end portion 108 in step 204. In step 206, the link manager 106 checks whether the received authentication-response LMP message (LMP_sres) is valid. Checking is performed using random information, which is included in the authentication-request LMP message sent in the step 202, and key information, which the link manager 106 holds. That is, the link manager 106 can compare the result of the calculation, using key information, which the link manager 106 has, and random information, which is included in the authentication-request LMP message (LMP_au_rand), with the authentication-response information included in the received authentication-response LMP message (LMP_sres) so as to determine whether the currently received authentication-response LMP message (LMP_sres) is valid. At this time, the link manager 106 has the same key information as the link manager 116.

When the result of checking in the step 206 indicates that the currently received authentication-response LMP message (LMP_sres) is not valid, the link manager 106 determines that the corresponding authentication procedure has failed, and a process for failed authentication is performed in step 208. For example, a notice that the corresponding authentication procedure has been failed can be sent to the corresponding host (not in drawings) and the authentication-request destination 110. Then, the corresponding authentication procedure is finished in step 210.

However, when the result of checking in the step 206 indicates that the received authentication-response LMP message (LMP_sres) is valid, the link manager 106 checks whether the current stage for establishing a connection is a pairing process in step 212. This is determined by whether information on the link key is stored in the memory 105 installed in the link manager 106. That is, when information on the link key is not stored in the memory 105, it is determined that the current stage for establishing a connection is a pairing process.

When the result of checking in step 212 indicates that the current stage for establishing a connection is a pairing process, the key used in the step 206 is the initialize-key information. Therefore, a link key which will be used between the link managers 106 and 116 must be generated. The link key is used to authenticate a link to be formed between the link managers 106 and 116 as a result of establishing a connection.

Therefore, when the current stage for establishing a connection is a pairing process, the link manager 106 sends an LMP message (LMP_comb_key or LMP_unit_key) for generating a link key to the authentication-request destination 110 through the end portion 108 and at the same time stores the LMP message in step 214. LMP_comb_key is an LMP message, which is sent when a link key is generated using the result of the combined key information of the link managers. 106 and 116, and when there is a message requesting generation of a combination key. LMP_unit_key is an LMP message, which is sent when a link key is generated using only key information that the link manager 106 holds, and when there is a message requesting generation of a unit key.

When an LMP message for generating a link key is sent in the step 214, the link manager 116 checks the authentication condition of the link manager 116 in step 308. The authentication condition of the link manager 116 is information which enables determination of whether a mutual authentication procedure must be considered. In the present embodiment, Authentication_Enable information is used for that. For example, when the Authentication_Enable information of the link manager 116 is set to '0x00', the link manager 116 determines that the mutual authentication need not be considered. Meanwhile, when the Authentication_Enable information is set to '0x01', the link manager 116 determines that the mutual authentication needs to be considered.

When the result of checking in the step 308 indicates that the mutual authentication need not be considered, then the currently received LMP message is for generating a link, and therefore the link manager 116 sends an LMP message (LMP_comb_key or LMP_unit_key), which is a response message for generating a link key, to the authentication-request source 100 through the end portion 118 in step 309. At this time, when link key information is generated using the result of the combined key information of the link managers 106 and 116 regardless of the LMP message in the step 214, the LMP message that is sent is a message requesting generation of a combination key (LMP_comb_key). When the link key information is generated using key information, which the link manager 116 holds, the LMP message that is sent is a message requesting generation of a unit key (LMP_unit_key).

Then, the link manager 116 generates a link key in step 310. When both LMP messages that are sent and received in order to establish a link key between the link managers 106 and 116 are messages requesting generation of a combination key (LMP_comb_key), the link manager 116 generates a link key based on the combined result. However, when the link manager 106 sends a message requesting generation of a combination key (LMP_comb_key) but the link manager 116 sends a message requesting generation of a unit key (LMP_unit_key), the link manager 116 generates a link key based on key information of the link manager 116. When both LMP messages that are sent and received between the link managers 106 and 116 are messages requesting generation of a unit key (LMP_unit_key), the link manager 116 generates a link key based on the key information of the link manager 106. When a link key is generated, the authentication procedure in the pairing process is finished in step 314.

However, when the result of checking in the step 308 indicates that the mutual authentication needs to be considered, the link manager 116 stores the LMP message, which was received for generating a link key, in the memory 115 in step 316. Then, in step 318, the link manager 116 sends an authentication-request LMP message (LMP_au_rand) to the authentication-request source 100 through the end portion 118.

Meanwhile, after the link manager 106 sends an LMP message for generating a link key in the step 214, when an LMP message from the other device, the authentication-request destination 110, is received in step 216, the link manager 106 checks the received LMP message in step 218. That is, the link manager 106 determines whether the received LMP message is a message for generating a link key (LMP_comb_key or LMP_unit_key) or an authentication-request LMP message (LMP_au_rand). Checking is performed using identification information (op code) loaded in the payload of the received message. That is, with the identification information, the link manager determines whether the currently received LMP message is an LMP message for generating a link key or an authentication-request LMP message.

When the result of checking in the step 218 indicates that the currently received LMP message is an LMP message for generating a link key (LMP_comb_key or LMP_unit_key), the link manager 106 generates a corresponding link key in step 220. At this time, when the LMP message, which was sent and received between the link managers 106 and 116 to generate a link key, is a message requesting generation of a combination key (LMP_comb_key), the link manager 106 generates a link key based on the combined result. However, when the link manager 106 has sent a message requesting generation of a combination key (LMP_comb_key) but the link manager 116 has sent a message requesting generation of a unit key (LMP_unit_key), the link manager 106 generates a link key based on the key information of the link manager 116. When the LMP message that was sent and received between the link managers 106 and 116 is a message requesting generation of a unit key (LMP_unit_key), the link manager 106 generates a link key based on the key information of the link manager 106. Thus, when a link key is thus generated, the authentication procedure of the pairing process is finished in step 210.

However, when the result of checking in the step 218 indicates that the received LMP message is an authentication-request LMP message (LMP_au_rand), the link manager 106 sends an authentication-response LMP message to the authentication-request destination 110 through the end portion 108 in step 222.

Therefore, the link manager 116 of the authentication-request destination 110 receives the authentication-response LMP message (LMP_sres) in step 320. Then, the link manager 116 checks whether the received authentication-response message is valid in step 322. Checking is performed in the same way as in the step 206. When the result of checking in the step 322 indicates that the received authentication-response message is not valid, the link manager 116 processes an authentication failure in step 324, and finishes the procedure in step 314. Processing an authentication failure is performed in the same way as in the step 208.

However, when the result of checking in the step 322 determines that the received authentication-response LMP message is valid, the next step is generating a link key. The link manager 116 sends an LMP message responding to the LMP message for generating a link key stored in the memory 115 in step 325. Then, the link manager 116 generates a link key in step 310 in the same way as in the step 326, and finishes the mutual authentication procedure of the pairing process in step 314.

The link manager 106 of the authentication-request source receives an LMP message that is a response message for generating a link key in step 224, and then, in step 225, checks whether the received LMP message is a response message corresponding to the message stored in the step 214. When the result of checking indicates that the received message is the corresponding response message, the link manager 106 generates a link key in step 226 in the same way as in the step 220, and then finishes the mutual authentication procedure of the pairing process in step 210. However, when the result of checking in the step 225 indicates that the received message is not the corresponding response message, the link manager 106 awaits the reception of the corresponding response message.

Meanwhile, when the result of the checking by the link manager 106 in the step 212 indicates that the current stage for establishing a connection is not a pairing process, the link manager 106 sends an LMP message of connection-establishment-completion (LMP_setup_complete) to the authentication-request destination 110 and stores the LMP message in the memory 105 in step 228.

Therefore, the link manager 116 receives the LMP message of connection-establishment-completion (LMP_setup_complete) in step 306, and checks the authentication condition of the link manager 116 in step 308. When the result of checking indicates that the mutual authentication is not needed, the link manager 116 sends an LMP message of connection-establishment-completion (LMP_setup_complete), which is a response message to the received LMP message, to the authentication-request source 100 in step 311. Then, the link manager 116 finishes the authentication procedure and establishes a corresponding connection in step 312, and finishes the procedure for establishing a connection in step 314.

However, when the result of checking in the step 308 indicates that the mutual authentication is needed, the link manager 116 stores the received LMP message of connection-establishment-completion (LMP_setup_complete), received in the step 316, in the memory 115 in step 316. The link manager 116 sends an authentication-request LMP message (LMP_au_rand) to the authentication-request source 100 in step 318.

The link manager 106 receives the LMP message from the other device, the authentication-request destination 110, in step 230, and checks whether the received message is an authentication-request LMP message (LMP_au_rand) or an LMP message of connection-establishment-completion (LMP_setup_complete) in step 232. Checking is performed in the same way as in the step 218.

When the result of checking in the step 232 indicates that the received message is an LMP message of connection-establishment-completion, the link manager 106 finishes the authentication procedure in step 235, and establishes a corresponding connection, and then finishes the procedure for establishing a connection in step 210. However, when the result of checking in the step 232 indicates that the received message is an authentication-request LMP message (LMP_au_rand), the link manager 106 sends an authentication-response message to the authentication-request destination 110 in step 236.

The link manager 116 receives the authentication-response LMP message in step 320, and checks, as described above, whether the received authentication-response LMP message is valid, in step 322. When the result of checking in the step 322 indicates that the received authentication-response LMP message is not valid, the link manager 116 performs the step 324. However, if the received authentication-response LMP message is valid, the link manager 116 sends an LMP message of connection-establishment-completion (LMP_setup_complete), which is a response message corresponding to the message of connection-establishment-completion stored in the memory 115, to the authentication-request source 100 in step 327. Then, the link manager 116 finishes the mutual authentication procedure in step 328, and establishes a corresponding connection and finishes the procedure for establishing a connection in step 314.

The link manager 106 receives the LMP message of connection-establishment-completion in step 238, and checks whether the received LMP message is the response message corresponding to the LMP stored in the memory in the step 228, in step 239. When the result of checking indicates that the received LMP message is the corresponding response message, the link manager 106 finishes the mutual authentication procedure in step 240, and establishes a corresponding connection and finishes the procedure for establishing a connection in step 210.

However, when the result of checking in the step 239 indicates that the received LMP message is not the corresponding response message, the link manager 106 awaits the reception of the corresponding response message.

Figure 4A:
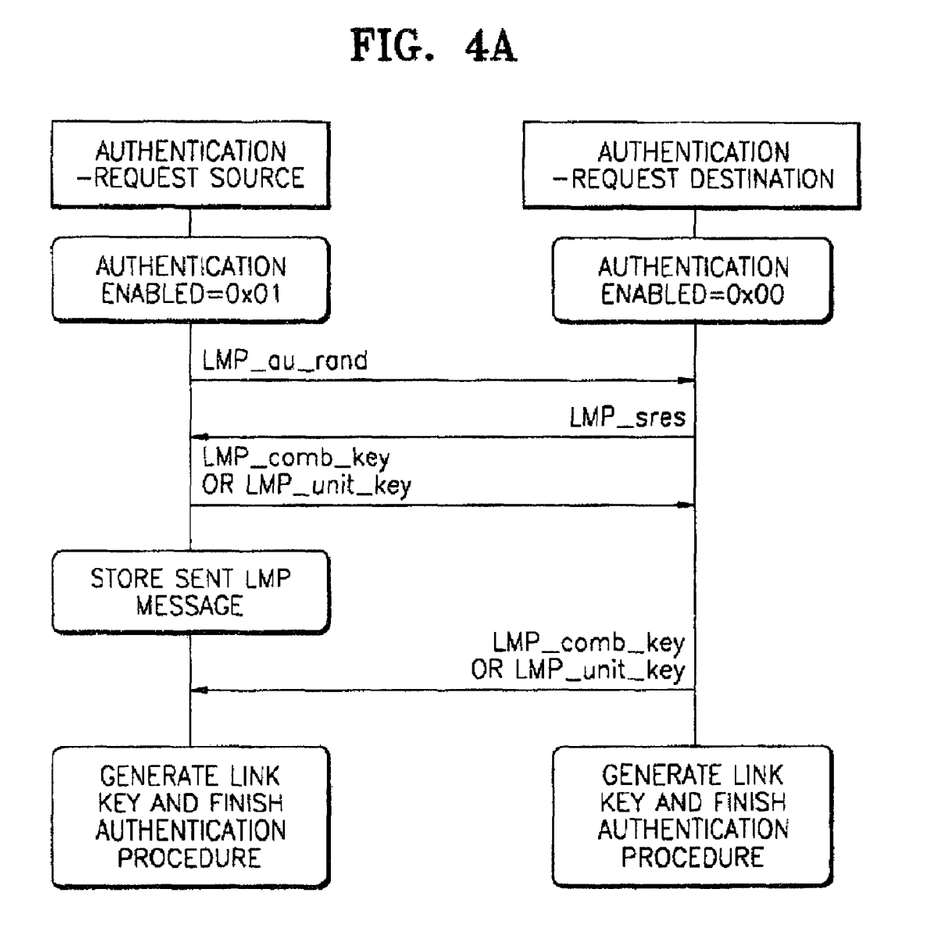
FIGS. 4A and 4B illustrate an authentication procedure in a pairing process.

FIG. 4A is a conceptual diagram of the authentication procedure performed in the pairing process and shows a unilateral authentication procedure. Therefore, as shown in FIG. 4A, Authentication_Enable for the link manager 106 of the authentication-request source 100 is set to '0x01', while Authentication_Enable for the link manager 116 of the authentication-request destination 110 is set to '0x00'.

In a state in which Authentication_Enables are set as described, the link manager 106 of the authentication-request source 100 sends an authentication-request LMP message (LMP_au_rand) to the link manager 116 of the authentication-request destination 110. Then, the link manager 116 of the authentication-request destination 110 sends an authentication-response LMP message (LMP_sres), which is a response message to the authentication-request LMP message, to the link manager 106 of the authentication-request source 100.

Then the link manager 106 of the authentication-request source 100 sends an LMP message (LMP_comb_key or LMP_unit_key) for generating a link key to the link manager 116 of the authentication-request destination 110 and at the same time stores the LMP message in the memory 105. After the link manager 116 of the authentication-request destination 110 receives the LMP message (LMP_comb_key or LMP_unit_key) for generating a link key, the link manager 116 of the authentication-request destination 110 sends an LMP message (LMP_comb_key or LMP_unit_key) for generating a link key, which is a response message to the received LMP message, to the link manager 106 of the authentication-request source 100, generates a corresponding link key, and finishes the authentication procedure of the pairing process. When the link manager 106 of the authentication-request source 100 receives the LMP message (LMP_comb_key or LMP_unit_key) for generating a link key, the link manager 106 of the authentication-request source 100 generates a corresponding link key, and finishes the authentication procedure of the pairing process.

Figure 4B:
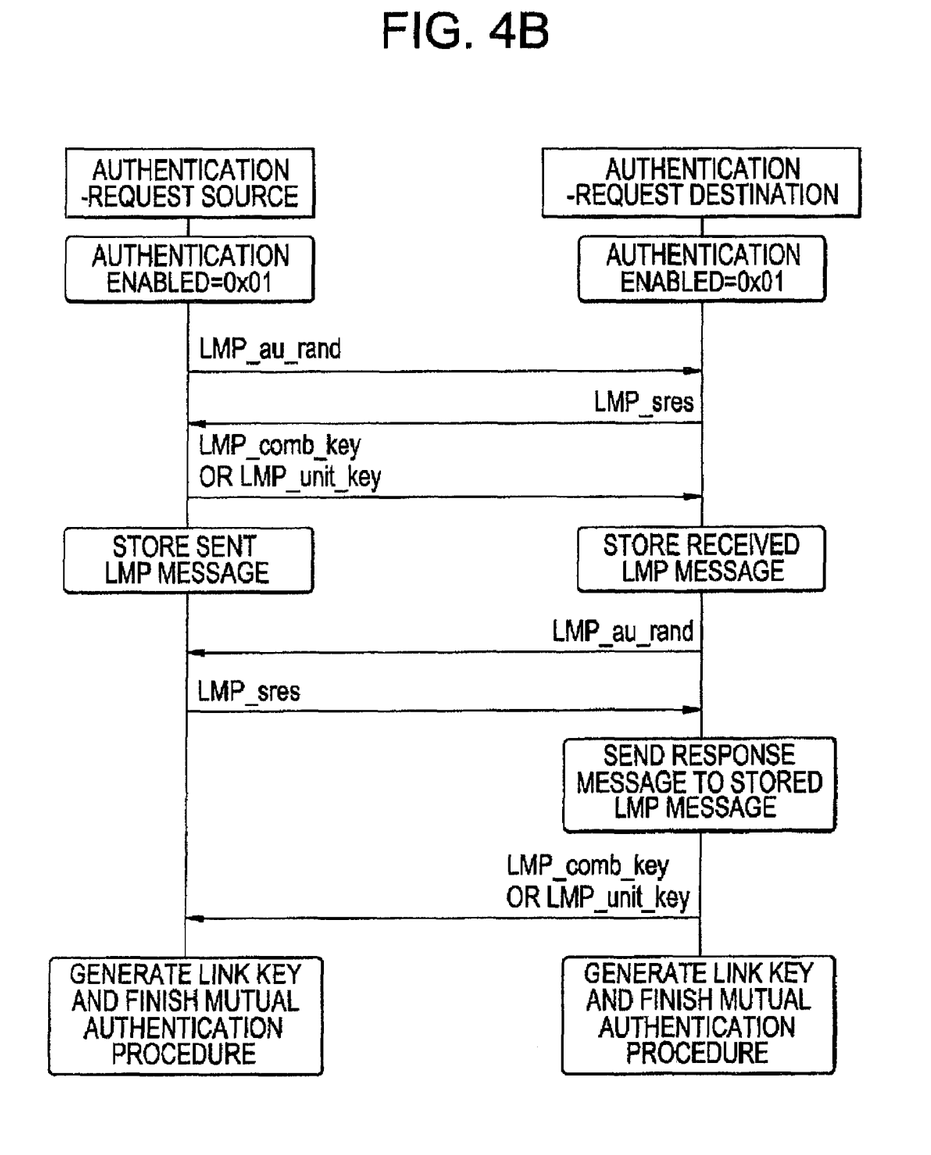

FIG. 4B is a conceptual diagram of the authentication procedure performed in the pairing process, and shows a mutual authentication procedure. Therefore, as shown in FIG. 4B, Authentication_Enables for both the link manager 106 of the authentication-request source 100 and the link manager 116 of the authentication-request destination 110 are set to "0x01".

In a state in which authentication-enables are set as described, the link manager 106 of the authentication-request source 100 sends an authentication-request LMP message (LMP_au_rand) to the link manager 116 of the authentication-request destination 110. Then, the link manager 116 of the authentication-request 110 sends an authentication-response LMP message (LMP_sres), which is a response message to the LMP message, to the link manager 106 of the authentication-request source 100.

Then the link manager 106 of the authentication-request source 100 sends an LMP message (LMP_comb key or LMP_unit_key) for generating a link key to the link manager 116 of the authentication-request destination 110 and at the same time stores the LMP message in the memory 105.

Since the Authentication_Enable of the link manager 116 of the authentication-request destination 110 is set to a value which requires a mutual authentication, the link manager 116 stores an LMP message (LMP_comb_key or LMP_unit_key) for generating a link key in the memory 115 when the LMP message is received. Then, the link manager 116 sends an authentication-request LMP message (LMP_au_rand) to the link manager 106 of the authentication-request source 100.

When the link manager 106 of the authentication-request source 100 receives an authentication-request LMP message (LMP_au_rand) from the link manager 116 of the authentication-request destination 110 after the link manager 106 of the authentication-request source 100 sent an LMP message for generating a link key, the link manager 106 of the authentication-request source 100 sends an authentication-response LMP message (LMP_sres), which is a response message to the received LMP message, to the link manager 116 of the authentication-request destination 110.

After the link manager 116 of the authentication-request destination 110 receives the authentication-response LMP message (LMP_sres), the link manager 116 sends the LMP message (LMP_comb_key or LMP_unit_key), which is a response message corresponding to the LMP message for generating a key and has been stored in the memory 115, to the link manager 106 of the authentication-request source 100, and then generates a corresponding link key and finishes the mutual authentication procedure of the pairing process. The link manager 106 of the authentication-request source 100 receives the response LMP message corresponding to the LMP message for generating the link key, generates a corresponding link key and finishes the mutual authentication procedure of the pairing process.

Figure 5A:
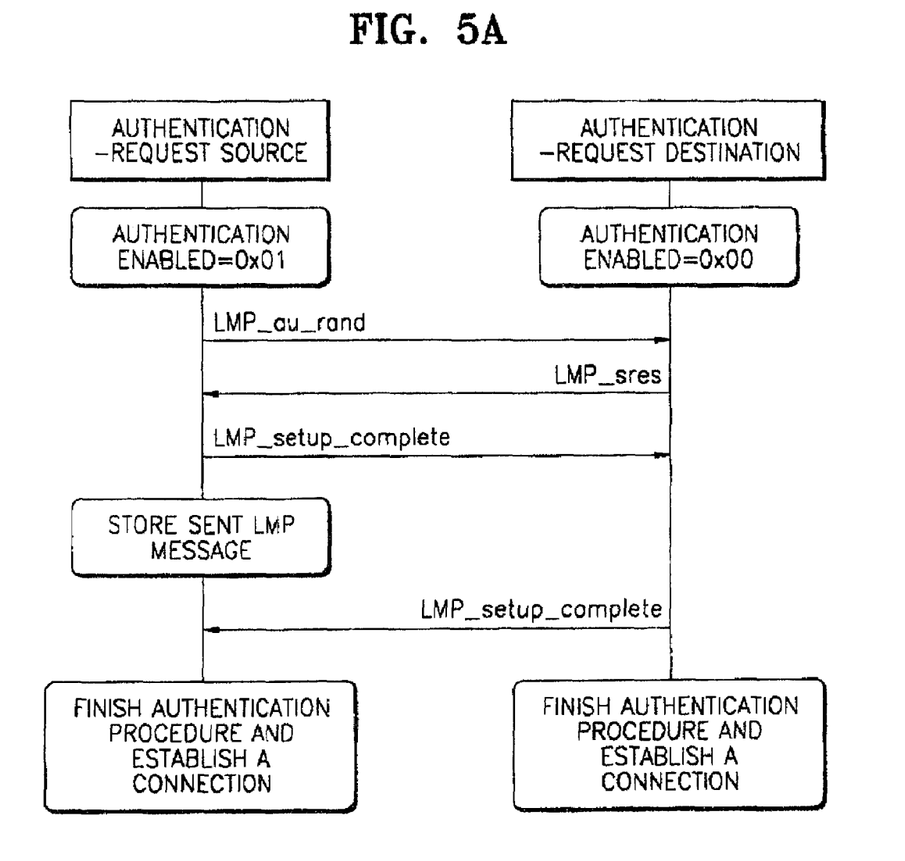
FIGS. 5A and 5B illustrate an authentication procedure after a link key is generated.

FIG. 5A is a conceptual diagram of the authentication procedure for establishing a connection after a link key is generated, and shows a unilateral authentication procedure. Therefore, as shown in FIG. 5A, the Authentication_Enable of the link manager 106 of the authentication-request source 100 is set to '0x01', and the Authentication_Enable of the link manager 116 of the authentication-request destination 110 is set to '0x00'.

In a state in which Authentication_Enables are set as described, the link manager 106 of the authentication-request source 100 sends an authentication-request LMP message (LMP_au_rand) to the link manager 116 of the authentication-request destination 110, and then the link manager 116 of the authentication-request destination 110 sends an authentication-response LMP message (LMP_sres), which is a response message to the received LMP message, to the link manager 106 of the authentication-request source 100.

Then, the link manager 106 of the authentication-request source 100 sends an LMP message of connection-establishment-completion (LMP_setup_complete) to the link manager 116 of the authentication-request destination 110, and at the same time stores the LMP message of connection-establishment-completion (LMP_setup_complete) in the memory 105. The link manager 116 of the authentication-request destination 110 receives the LMP message of connection-establishment-completion, and then sends an LMP message (LMP_setup_complete), responding to the received LMP message, to the link manager 106 of the authentication-request source 100. At the same time the link manager 116 finishes the authentication procedure and establishes a corresponding connection. The link manager 106 of the authentication-request source 100 receives the response LMP message (LMP_setup_complete) and then finishes the authentication procedure and establishes a corresponding connection.

Figure 5B:
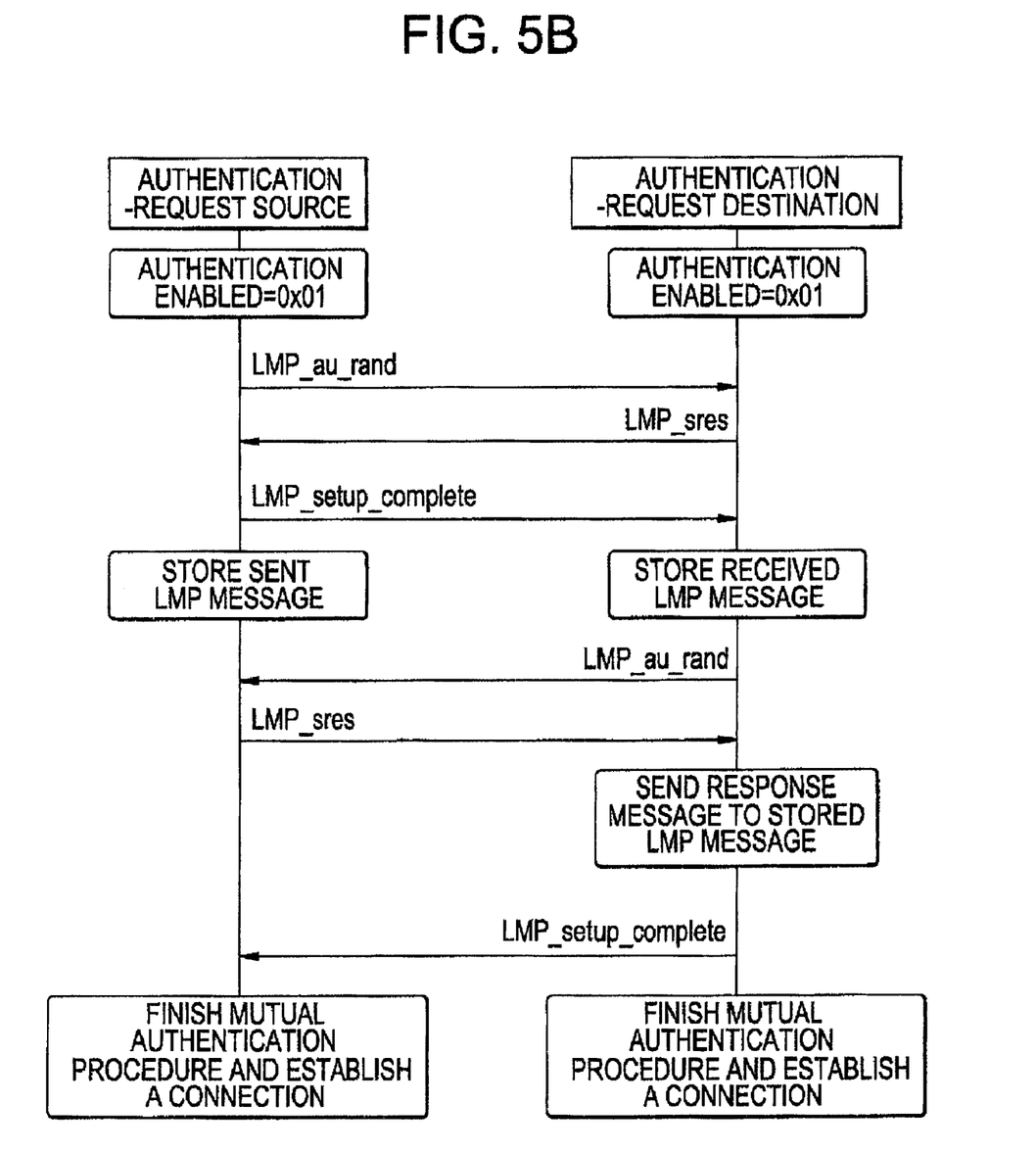

FIG. 5B is a conceptual diagram of the authentication procedure for establishing a connection after a link key is generated, and shows a mutual authentication procedure. Therefore, as shown in FIG. 5B, the Authentication_Enables of both the link manager 106 of the authentication-request source 100 and the link manager 116 of the authentication-request destination 110 are set to '0x01'.

In a state in which Authentication_Enables are set as described, the link manager 106 of the authentication-request source 100 sends an authentication-request LMP message (LMP_au_rand) to the link manager 116 of the authentication-request destination 110, and then the link manager 116 of the authentication-request destination 110 sends an authentication-response LMP message (LMP_sres), which is a response message to the received LMP message, to the link manager 106 of the authentication-request source 100.

Then, the link manager 106 of the authentication-request source 100 sends an LMP message of connection-establishment-completion (LMP_setup_complete) to the link manager 116 of the authentication-request destination 110, and at the same time stores the LMP message of connection-establishment-completion (LMP_setup_complete) in the memory 105. Since the Authentication_Enable of the link manager 116 is set to a value which requires a mutual authentication, the link manager 116 of the authentication-request destination 110 stores an LMP message of connection-establishment-completion (LMP_setup_complete) in the memory 115 when the LMP message is received. Then, the link manager 116 sends an authentication-request LMP message (LMP_au_rand) to the link manager 106 of the authentication-request source 100.

When the link manager 106 of the authentication-request source 100 receives an authentication-request LMP message (LMP_au_rand) from the link manager 116 of the authentication-request destination 110 after the link manager 106 of the authentication source 100 had sent the LMP message of connection-establishment-completion (LMP_setup_complete), the link manager 106 of the authentication-request source 100 sends an authentication-response LMP message (LMP_sres), which is a response message to the LMP message, to the link manager 116 of the authentication-request destination 110.

After receiving the authentication-response LMP message (LMP_sres), the link manager 116 of the authentication-request destination 110 sends an LMP message (LMP_setup_complete), which is a response message corresponding to the LMP message of connection-establishment-completion that is stored in the memory 115, to the link manager 106 of the authentication-request source 100, and then finishes the mutual authentication procedure and establishes a connection. The link manager 106 of the authentication-request source 100 receives the LMP message (LMP_setup_complete), which is corresponding to the LMP message of connection-establishment-completion (LMP_setup_complete) that is stored in the memory 105, and then finishes the mutual authentication procedure and establishes a connection.

The authentication method for establishing a connection between the link managers described above can be applied to a structure in which the authentication-request source 100 and the authentication-request destination 110 are integrated in a single host (not in drawings).

As described above, the present invention provides a method for performing an authentication procedure between transmitting and receiving link managers according to the authentication condition of the authentication-request destination when a connection is established between devices operating in a communication environment using communication specifications such as Bluetooth, and, therefore, more reliably and precisely establishes connections in a communication environment that operates based on communication specifications such as Bluetooth.

What is claimed is:

1. An authentication method for establishing a connection between devices that can wirelessly communicate data, the method comprising the steps of:
   (a) sending a first authentication-request message to another device to perform an authentication procedure with the other device to which a connection is wanted;
   (b) sending a predetermined message according to a current operation mode to the other device and storing the predetermined message when an authentication-response message to the first authentication-request message is received;
   (c) after performing the step (b), checking whether a received first message is a response message corresponding to the predetermined message when the first message from the other device is received;
   (d) sending a response message corresponding to a second authentication-request message to the other device when the result of checking in the step (c) indicates that the first message is the second authentication-request message;
   (e) after performing the step (d), checking whether a second message is a response message corresponding to the predetermined message when the second message from the other device is received; and
   (f) finishing the authentication procedure when the result of checking in the step (e) indicates that the second message is a response message corresponding to the predetermined message,
   wherein in the step (b), when the current operation mode is a pairing process, a message for generating a link key is sent as the predetermined message and stored, and when the current operation mode is not a pairing process, a message of connection-establishment-completion is sent as the predetermined message and stored; and the step (f) further comprises the sub-steps of:
   (f1) generating a link key before finishing the authentication procedure when the current operation mode is a pairing process; and
   (f2) finishing the authentication procedure and establishing a connection to the other device when the current operation mode is not a pairing process.

2. The authentication method of claim 1, wherein the step (b) further comprises the sub-steps of:
   (b1) checking whether the authentication-response message is valid using key information and random information; and
   (b2) processing an authentication failure when the result of checking in the step (b1) indicates that the authentication-response message is not valid.

3. The authentication method of claim 2, wherein in the step (b1), the key information is held by the present device and the random information was used in sending the first authentication message.

4. The authentication method of claim 3, wherein in the step (b), when the current operation mode is not a pairing process, a message of connection-establishment-completion is sent as the predetermined message and stored; and
   the step (g) further comprises the sub-steps of:
   (g1) generating a link key before finishing the authentication procedure when the current operation mode is a pairing process; and
   (g2) finishing the authentication procedure and establishing a connection to the other device when the current operation mode is not a pairing process.

5. The authentication method of claim 1, further comprising the step of:
   (g) finishing the authentication procedure when the result of checking in the step (c) indicates that the received first message is a response message corresponding to the predetermined message.

* * * * *